United States Patent
Harvey et al.

(10) Patent No.: US 9,296,468 B1
(45) Date of Patent: Mar. 29, 2016

(54) AERIAL VEHICLE WITH SEPARATION OF WINGED SURFACES IN FIRST AND SECOND FLEXED STATES

(71) Applicant: Brandebury Tool Company, Inc., Gaithersburg, MD (US)

(72) Inventors: William B. Harvey, Laytonsville, MD (US); Matthew G. Amsellem, Monrovia, MD (US)

(73) Assignee: Brandebury Tool Company, Inc., Gaithersburg, MD (US)

( * ) Notice: Subject to any disclaimer, the term of this patent is extended or adjusted under 35 U.S.C. 154(b) by 181 days.

(21) Appl. No.: 14/032,800

(22) Filed: Sep. 20, 2013

Related U.S. Application Data (60) Provisional application No. 61/704,363, filed on Sep. 21, 2012.

(51) Int. Cl.
*B64C 3/40* (2006.01)
*B64C 39/02* (2006.01)

(52) U.S. Cl.
CPC .................. *B64C 3/40* (2013.01); *B64C 39/024* (2013.01); *B64C 2201/102* (2013.01)

(58) Field of Classification Search
CPC ...... B64C 1/26; B64C 3/40; B64C 2201/102; B64C 3/546; B64C 2003/543; B64C 2203/00; A63H 27/00; A63H 27/007; A63H 27/14; A63H 27/12; A63H 27/04; F42B 10/14; G01P 5/165; G01P 5/16; G01F 1/46; G01N 2001/225; G01N 1/2247
See application file for complete search history.

(56) References Cited

U.S. PATENT DOCUMENTS

| | | | | |
|---|---|---|---|---|
| 2,306,866 A * | 12/1942 | Crary | ............................... | 446/62 |
| 2,673,047 A * | 3/1954 | Scarato | ............................ | 244/49 |
| 3,009,670 A * | 11/1961 | Williams et al. | ................ | 244/46 |
| 3,212,732 A * | 10/1965 | Scerbo et al. | .................... | 244/46 |
| 3,654,729 A * | 4/1972 | Imperato | ......................... | 446/62 |
| 3,839,818 A * | 10/1974 | Heggedal | ........................ | 446/62 |
| 5,442,958 A * | 8/1995 | Hagen | ......................... | 73/170.02 |
| 6,186,443 B1* | 2/2001 | Shaffer | ........................... | 244/49 |
| 2005/0152434 A1* | 7/2005 | D'Ouince et al. | ............ | 374/208 |
| 2007/0069065 A1* | 3/2007 | Parks | ............................. | 244/7 B |

(Continued)

FOREIGN PATENT DOCUMENTS

JP    07207990 A * 8/1995  ............. E04H 15/20

OTHER PUBLICATIONS

JP 07207990 Derwent summary (Abstract) and Detailed Description (English machine translation).*

(Continued)

*Primary Examiner* — Tien Dinh
*Assistant Examiner* — Alexander V Giczy
(74) *Attorney, Agent, or Firm* — Lieberman & Brandsdorfer, LLC (57) ABSTRACT

Embodiments include an aerial vehicle. Two winged surfaces are provided in communication with a fuselage. The surfaces are in communication at a front edge via a cuff, at a midsection via a first resilient member, and at a trailing edge via a second resilient member. As the aerial vehicle is in flight, it is subject to loads. The connections of the surfaces provides flexibility and resiliency to maintain the surfaces in communication with the fuselage and to allow regulated separation of the winged surfaces at their rear edges in a first direction in a first flexed state and at their front edges in a second direction, different from the first direction, in a second flexed state.

25 Claims, 7 Drawing Sheets

(56) References Cited

U.S. PATENT DOCUMENTS

2007/0084971 A1* 4/2007 Miyake ............... 244/190
2008/0217470 A1* 9/2008 Zhao ................ 244/99.3
2011/0127384 A1* 6/2011 Afanasyev ........... 244/203
2011/0186678 A1* 8/2011 Sankovic ........... 244/3.27

OTHER PUBLICATIONS

Wikipedia, McDonnell Douglas F-4 Phantom II webpage. Archived by Internet Archive on Oct. 8, 2010; https://web.archive.org/web/20101008053019/http://en.wikipedia.org/wiki/McDonnell_Douglas_F-4_Phantom_II; accessed Jul. 26, 2015.*

Model Airplane News, "Total Control: The Right Way to Set Up Servos", Feb. 9, 2012, http://www.modelairplanenews.com/blog/2012/02/09/total-control-the-right-way-to-set-up-servos/, accessed Jul. 26, 2015.*

RC Groups, "Detachable wings how? Any tips and tricks are welcome," posted Sep. 17, 2009, http://www.rcgroups.com/forums/showthread.php?t=1112945; accessed Jul. 22, 2015.*

* cited by examiner

AERIAL VEHICLE WITH SEPARATION OF WINGED SURFACES IN FIRST AND SECOND FLEXED STATES

CROSS REFERENCE TO RELATED APPLICATION(S)

This application is a non-provisional patent application claiming the benefit of the filing date of U.S. Patent Application Ser. No. 61/704,363 filed on Sep. 21, 2012 and titled "Unmanned Aerial Vehicle" which is hereby incorporated by reference.

BACKGROUND

An unmanned aerial vehicle (UAV), sometimes called an unmanned air-reconnaissance vehicle, is a non-piloted aircraft. UAVs are known in the art and can be operated via remote control or fly autonomously based on pre-programmed flight plans or more complex dynamic automation systems. UAVs are currently used in a number of military roles, including reconnaissance and attack. They are also used in a small but growing number of civil applications such as firefighting where a human observer would be at risk, police observation of civil disturbances and scenes of crimes, and reconnaissance support in natural disasters. Accordingly, UAVs are often preferred for missions where the risk to human life is mitigated. There are a wide variety of UAV shapes, sizes, configurations, and characteristics. For the purposes description and to distinguish UAVs from missiles, a UAV is defined as an aircraft capable of being controlled, sustained level flight and powered by a jet or reciprocating engine. Cruise missiles are not classed as UAVs, because, like many other guided missiles, the vehicle itself is a weapon that is not reused even though it is also unmanned and might in some cases be remotely guided.

UAVs typically fall into one of six functional categories, although multi-role airframe platforms are becoming more prevalent. Such categories include: target and decoy to provide ground and aerial gunnery to a target that simulates an enemy aircraft or missile, reconnaissance to provide battlefield intelligence, combat to provide attack capability for high-risk missions, logistics for UAVs specifically designed for cargo and logistics operation, research and development used to further develop UAV technologies to be integrated into field deployed UAV aircraft, and civil and commercial UAVs for UAVs specifically designed for civil and commercial applications. In one embodiment, UAVs can also be categorized in terms of range and/or altitude.

SUMMARY

Embodiments as shown and described herein to enhance functionality of the UAV. Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention and not all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the present invention, as presented in the Figures, is not intended to limit the scope of the invention, but is merely representative of selected embodiments of the invention.

References throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "one embodiment," or "an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of resilient members, connectors, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Figure 1:
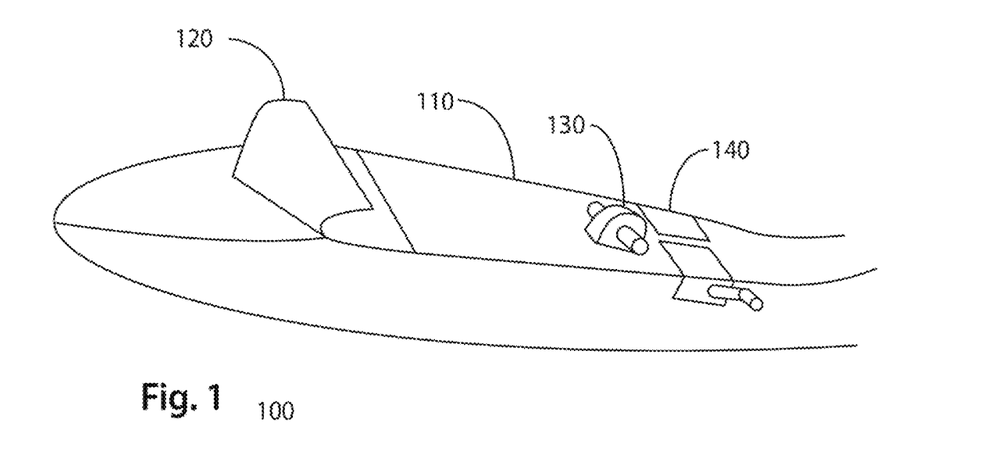
FIG. 1 is a perspective view of a fuselage of an unmanned air vehicle.

FIG. 1 depicts a perspective view (100) of a fuselage (110) for an unmanned air vehicle, such as a UAV. As shown, the fuselage (110) has a body with elements to communicate with moving surfaces, such as winged surfaces. More specifically, the fuselage (110) includes a cuff (120), a retaining element (130), and a servo (140). The cuff (120) is spaced apart from both the retaining element (130) and the servo (140). A winged surface having at least one pair of wings (not shown) is secured to the fuselage (110) via the retaining element (130). The cuff (120) is positioned to be in communication with one area of the secured winged surface, and functions to support and maintain stability of the winged surface when subject to a force. The servo (140) functions as an additional element to secure the winged surface to the fuselage (110). At the same time, the servo (140) includes additional functionality as will be described in detail below. Accordingly, the fuselage (110), in conjunction with the cuff (120), retaining element (130), and servo (140) function to receive the winged surface and to provide support for the winged surface when subject to a force.

Figure 2:
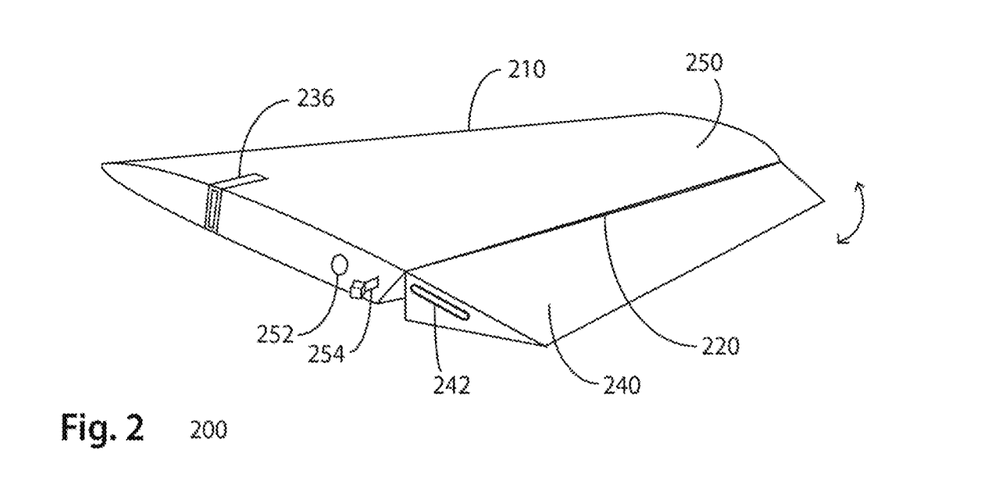
FIG. 2 is a perspective view of a winged surface to be secured to the fuselage shown in FIG. 1.

FIG. 2 depicts a perspective view (200) of a winged surface (210) to be secured to the fuselage (110) shown in FIG. 1. The winged surface (210) includes two panels, a first panel (240) and a second panel (250), both configured to attach to the fuselage (110). The two panels (240) and (250) are attached about an axis (220). More specifically, the first panel (240) is provided with a first aperture (242) to enable communication with the servo (140) of the fuselage (110). The second panel (250) includes a second aperture (252) to enable communication with the retaining element (130) of the fuselage (110). In one embodiment, a latch (254) is provided to lock the retaining element (130) to the second panel (250). The winged surface (210) is further provided with a wing aperture (236) to receive a resilient member (not shown), described in detail in FIG. 4.

The first panel (240) of the winged surface (210) is also known as an aileron, which is a movable surface, usually near the trailing edge of a winged surface, that controls the roll of the airframe or effects maneuvers, as banks and the like. Movement of the first panel (240) is supported by the second panel (250) and the fuselage (110). In one embodiment, the servo (140) controls movement of the first panel (240) with respect to a position of the second panel (250). Similarly, in one embodiment, the first aperture (242) is shown as an elongated aperture to support extension of the first panel (240). More specifically, the length of the elongated aperture defines the degree of movement of the first panel (240). Accordingly, the servo control movement of the first panel (240) of the winged surface (210), and the configuration of the aperture (242) define the degree of movement of the first panel (240) with respect to the second panel (250).

Figure 3:
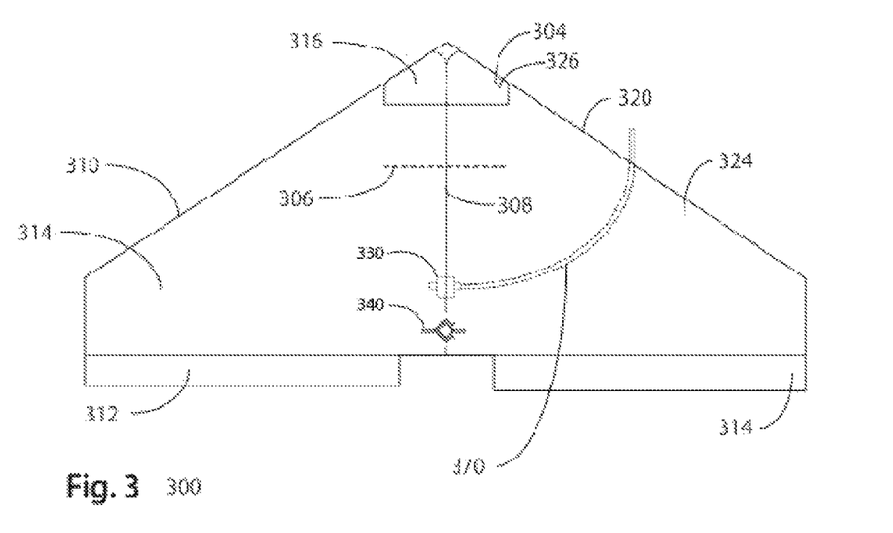
FIG. 3 is a top view of a set of wings for a winged surface, having a cuff and a resilient member to support flexibility and to mitigate damage to the wings when subject to a force or impact.

FIG. 3 is a top view of a set of wings (310) and (320) for a winged surface (300), having a cuff (304) and a resilient member (306) to support flexibility and to mitigate damage to the wings (310) and (320) when subject to a force or impact. In FIG. 3, the set of wings are shown in a neutral position. In one embodiment, the neutral position is maintained where there is no significant force applied to the winged surface. Each wing (310) and (320) is provided having a first panel (312), (322) and a second panel (314), (324), respectively. Wings (310) and (320) are mounted in a reflective manner, with each of the wings attaching to opposite sides of the fuselage. Each of the wings attaches to the fuselage via the retaining element (330) and the servo (340) as shown in FIG. 1. The resilient member (306) is secured in a resilient member aperture, such as the resilient member aperture (236) as shown in FIG. 2. The resilient member (306) extends from both wings across a gap (308). In the neutral position, the resilient member (306) is in a relaxed state being substantially linear. When subject to a force, the position and shape of the resilient member (306) may change, while remaining secured to each of the wing apertures. The cuff (304), as described in FIG. 1, is secured to the fuselage. As shown, the cuff receives a front end (316), (326) of each of the wings (310), (320), respectively. The two wings (310) and (320) are separate entities that are held together by their connections to the fuselage and the resilient member (306). As shown, a tube or conduit (370) extends from the retaining element (330) in communication with the fuselage to a front end (326) of one of the wings (320). In one embodiment, the tube or conduit (370) extends through the body of one of the wings (320). The functionality of the tube or conduit (370) pertains to measurement of air flow, as is described in detail below. Accordingly, the cuff (304) functions to hold and/or receive a front end of the wings in position when they are in a neutral state.

Figure 4:
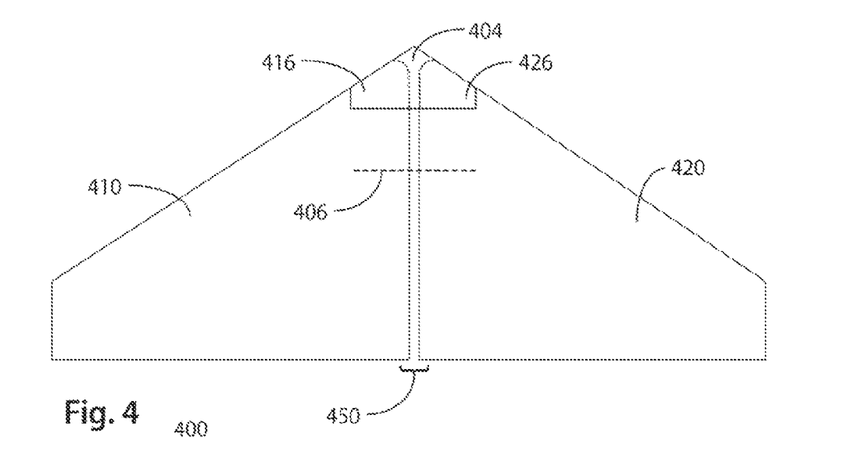
FIG. 4 is a top view of a set of wings taken from FIG. 3, with the wings in a neutral position.

FIG. 4 is a top view (400) of a set of wings taken from FIG. 3, with the wings (410) and (420) in a neutral position. As shown, the two wings (410) and (420) are adjacently positioned, with a spacing (450) there between. The cuff (404) receives a front end (416), (426) of each of the wings (410), (420), respectively. The wings (410) and (420) are held together by their connections to the fuselage, as described in detail in FIG. 1, and the resilient member (406).

Figure 5:
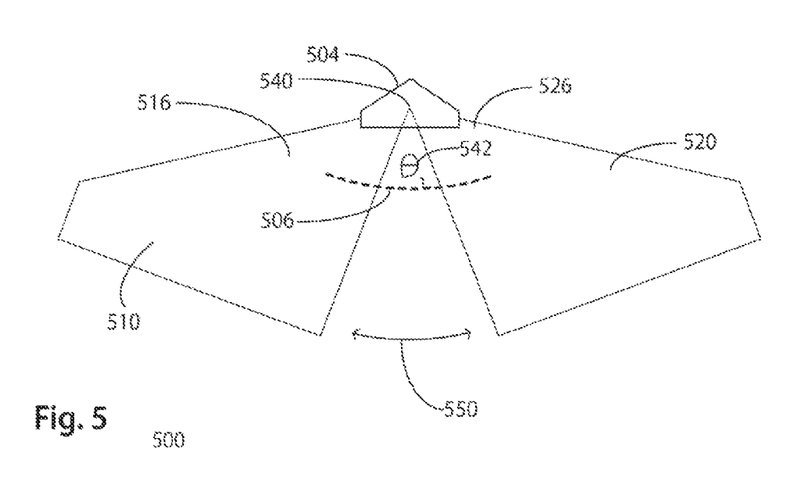
FIG. 5 is a top view of a set of wings taken from FIG. 3, with wings in a flexed forward position.

FIG. 5 is a top view (500) of a set of wings taken from FIG. 3, with wings (510) and (520) in a flexed forward position. In one embodiment, the flexed forward position is in reaction to a significant force applied to the wing such as a force applied to the wing in response to an impact to the fuselage (110). In one embodiment, the flexed forward position is a reaction to a nose of the fuselage (110) impacting an object. In the flexed forward position, the wings (510) and (520) are separated with respect to a first pivot (540) located within or near the cuff (504). Furthermore, the spacing (550) is widened with respect to the spacing (450) in the neutral position at an angle $\theta_1$ (542) with respect to the first pivot (540). Upon the wing flexing forward, the resilient member (506) is in a state of tension. In one embodiment, this state of tension shows the resilient member (506) curved and creating an arc with respect to the first pivot angle $\theta_1$ (542). The resilient member (506) is in tension such that it prevents the wings (510) and (520) from separating past a threshold. In one embodiment, the threshold is dependent and in correlation with the force of impact. The cuff (504) maintains a communication between a front end (516), (526) of each of the wings (510) and (520) respectively, upon separation of the wings. The flexed forward position of the wings allows for the wings to travel with momentum of the winged surface and increase the time at which the change in momentum is applied. Accordingly, the cuff (504) and resilient member (506) allow for regulated separation of the wings in the forward direction, thereby increasing the time at which the wing decreases momentum upon impact while holding the winged device together as a unit.

Figure 6:
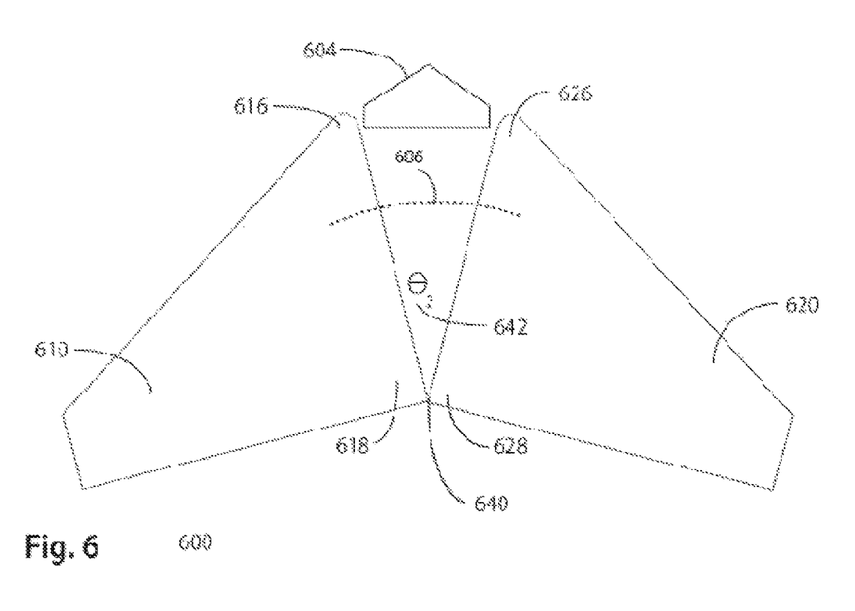
FIG. 6 is a top view of a set of wings taken from FIG. 3, with wings in a flexed backward position.

FIG. 6 is a top view (600) of a set of wings taken from FIG. 3, with wings (610) and (620) in a flexed backward position. In one embodiment, the flexed backward position is in reaction to a significant force applied to wings (610) and/or (620). In this position, wing (610) and wing (620) are separated with respect to a second pivot (640) located at a bottom end (618), (628) of the wing (610), (620), respectively. In one embodiment, the bottom ends (618) and (628) overlap such that the wings flex backward at a greater pivot angle. Gap (640) is widened at an angle $\theta_2$ (642). The front end (616) of wing (610) and the front end (626) of wing (620) are separated within the cuff (604). Upon the wing flexing backward, the resilient member (606) moves from a neutral state to a state of tension. In this state of tension, the resilient member is curved creating an arc with respect to the second pivot angle $\theta_2$ (642). The resilient member (606) is in tension such that the resilient member (606) prevents the wings (610) and (620) from separating past a particular threshold. In one embodiment, the threshold is dependent and in correlation with the force of impact on wing (610) or (620). Accordingly, the provided cuff (604) and resilient member (606) allow for regulated separation of the wings in the backward direction, thereby increasing the time at which a wing decreases momentum upon impact while holding the winged surface together as a unit.

Figure 7:
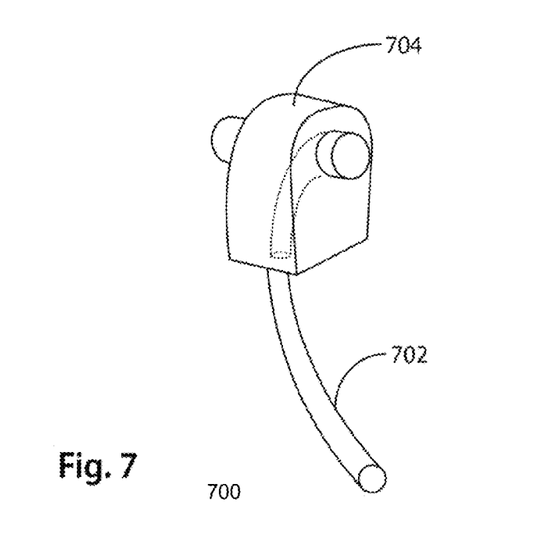
FIG. 7 is a perspective view of the retaining element as described in FIG. 1.

FIG. 7 is a perspective view of the retaining element (700) as described in FIG. 1. The retaining element includes a retaining pin to secure the wing to the fuselage (110). As described above in FIG. 1, the fuselage has a pin or other form of extended element to be received by an aperture within the wing. The retaining element (704) includes a pitot tube (702) in communication therewith. As shown, the pitot tube is received by the retaining element and is in communication with a port (not shown). In one embodiment, the pitot tube extends though the wing from a position adjacent to the fuselage to a front area, as described in detail below. In flight, it is necessary for certain winged devices to measure and take into account local air current patterns for purposes of determining accurate trajectories, and to manage control of the vehicle. This measurement is often done through the use of a pitot tube attached to the winged device. The pitot tube (702) intakes air to facilitate and enable computation of the speed of the winged device. Accordingly, as shown, herein, the pitot tube communicates with the fuselage via the retaining element.

Figure 8:
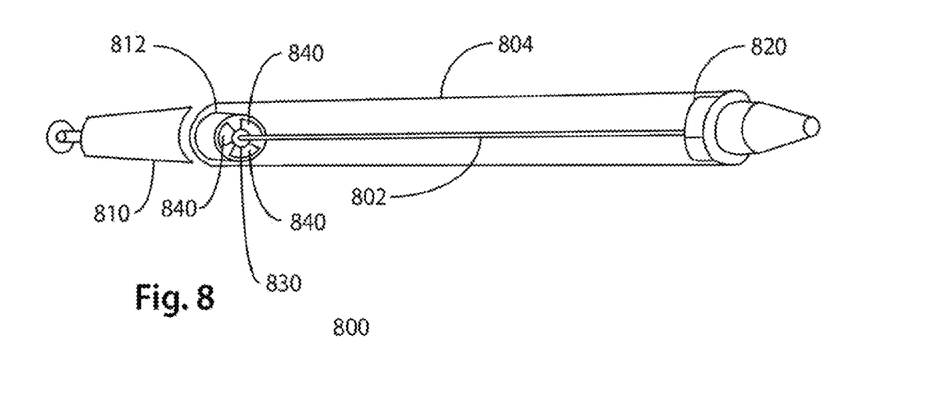
FIG. 8 is a perspective view of the exterior element of the pitot tube as it communicates with a front end of the wing.

FIG. 8 is a perspective view (800) of the exterior element of the pitot tube as it communicates with a front end of the wing. During flight, the pitot tube is subject to wind currents, and as such needs to be flexible, and at the same time needs to retain its shape in order to continue to receive airflow. A nitinol memory wire (802) is incased in a tubing (804). In one embodiment, the tubing (804) is flexible and allows the pitot tube to bend into a configuration different than the initial configuration of the tubing in response to a significant force applied to the pitot tube. This bending prevents breakage to the pitot tube in response to stress and strain. The nitinol memory wire (802) returns the tubing (804) to the initial configuration of the flexible tubing prior to the impact force. This return to an initial configuration is significant as the tubing (804) must be set in a specific configuration to accurately record air pressure. The tubing (804) includes a first end (810) adjacently position to the wing, and an oppositely disposed second end (820). A first retainer (812) is positioned in an interior section of the tubing adjacent to the first end (810) and a second retainer (not shown) is positioned in the interior section of the tubing adjacent to the second end (820). The first retainer (812) includes a centrally position aperture (830) to receive the wire (802), and a set of secondary apertures (840) spaced about the central aperture (830) to receive air flow. Air flows through the tubing (804), into the section of the tubing mountable to the wing (810), and into a section of the pitot tube embedded within the wing and in communication with the fuselage.

Figure 9:
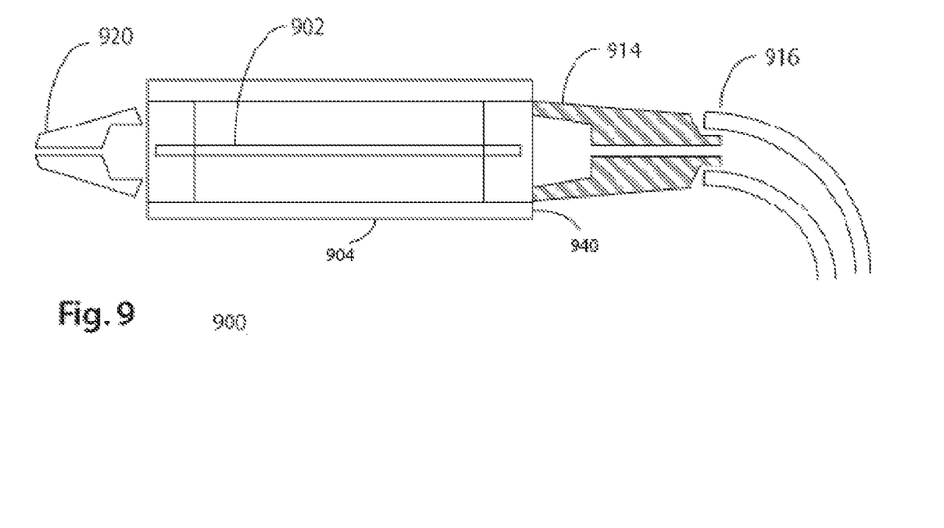
FIG. 9 is a side cut away view of the pitot tube of FIG. 8.

FIG. 9 is a side cut away view of the pitot tube (900) of FIG. 8. All elements of FIG. 8 are incorporated in FIG. 9. As shown in FIG. 9, air enters through the mouth piece (920) and is free to travel around the memory wire (902) through the tubing (904). Passage ways for air further exist within the mountable section of the tubing (914) and the embedded section of the tubing (916). The memory wire (902) is received by memory wire retainer (940).

Figure 10:
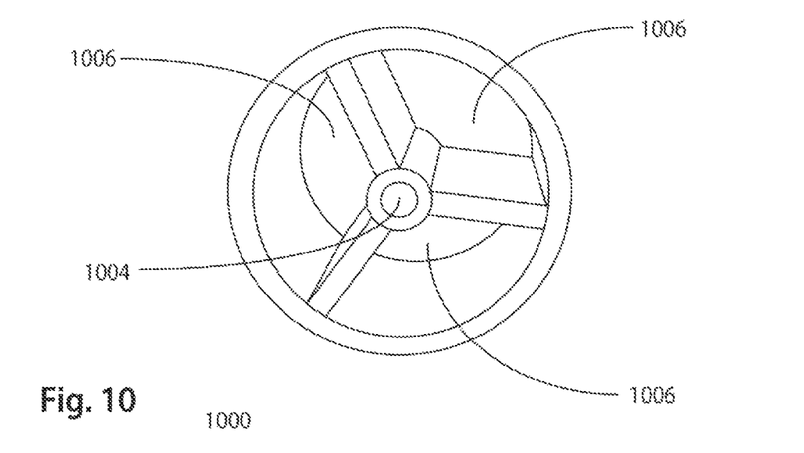
FIG. 10 is a perspective view of the memory wire retainer.

FIG. 10, is a perspective view of the memory wire retainer (1000). The memory wire retainer (1000) is provided with an aperture (1004) to receive and hold memory wire, such as the memory wire (902) as shown in FIG. 9. The memory wire retainer (1000) further provides passages (1006) surrounding the memory wire to allow air flow. The structure of the memory wire retainer (1000) minimizes impedance of air flow caused by the memory wire (1002).

Figure 11:
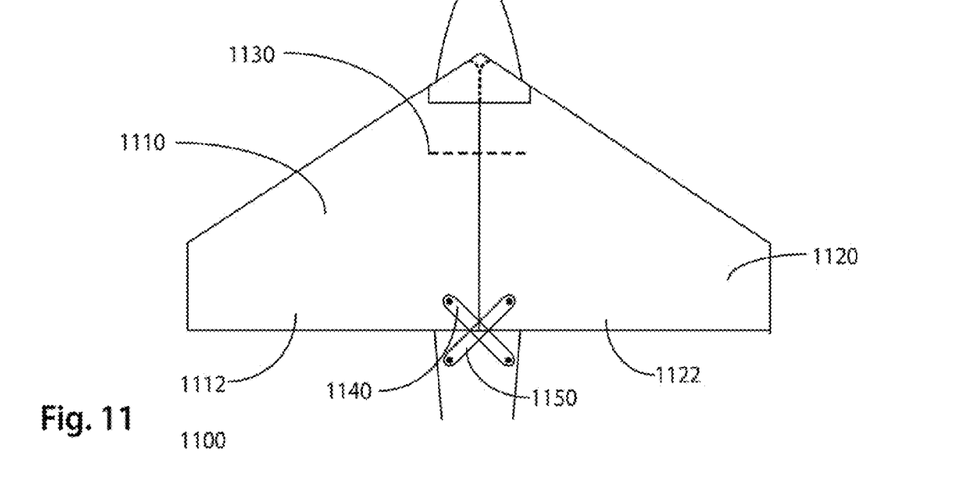
FIG. 11 is a top view of an embodiment of the vehicle with a member to hold a trailing edge of the vehicle wings in a position, in a neutral position.
Figure 12:
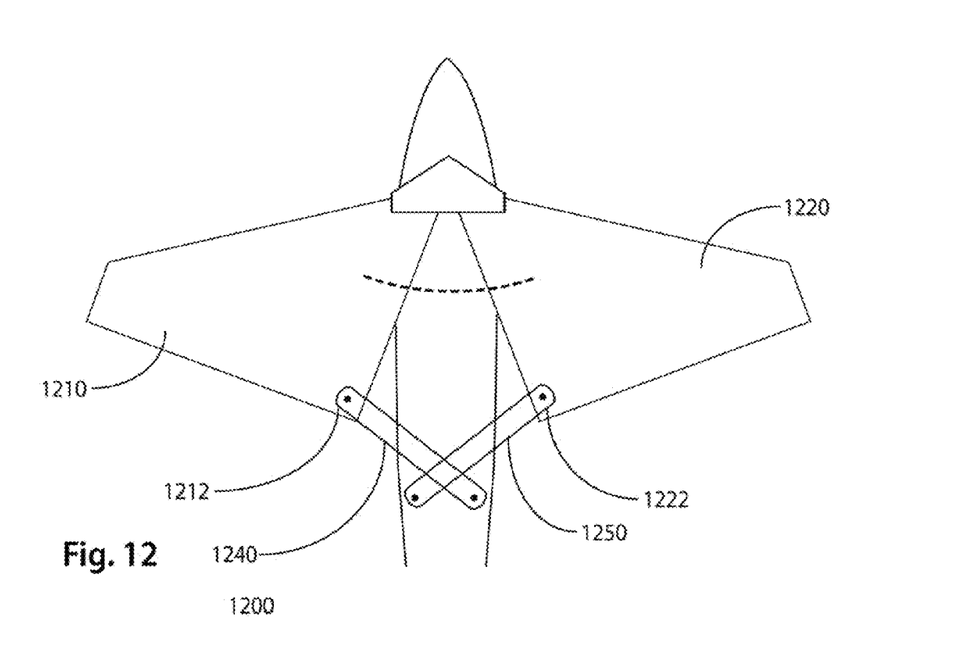
FIG. 12 is a top view of an embodiment of the vehicle with a member to hold a trailing edge of the vehicle wings in a position, in a flex forward position.
Figure 13:
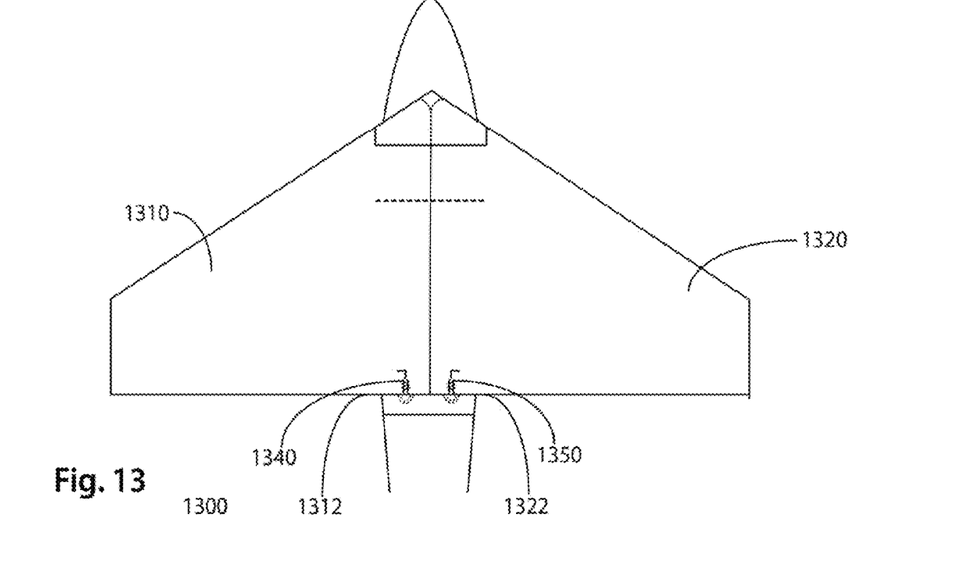
FIG. 13 is a top view of an embodiment of the vehicle with a member to hold a trailing edge of the vehicle wings in a position, in a neutral position.
Figure 14:
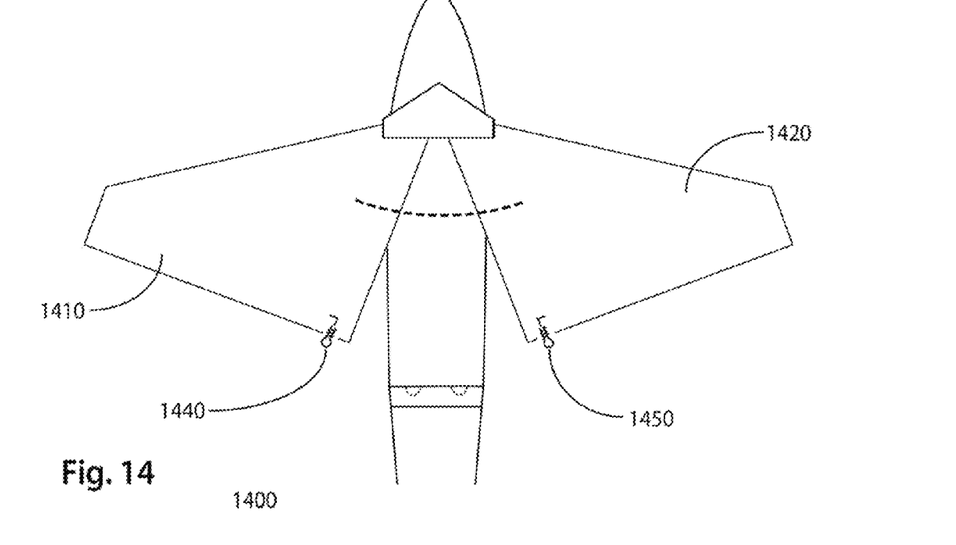
FIG. 14 is a top view of an embodiment of the vehicle with a member to hold a trailing edge of the vehicle wings in a position, in a flex forward position.

FIGS. 11-14 are top views of an embodiment of the vehicle with a member to hold a trailing edge of the vehicle wings in a position. As shown in FIG. 11, the vehicle (1100) is shown with two wings (1110) and (1120), each having a trailing edge (1112), (1122), respectively. A resilient member (1130) is shown to hold the wings in position and in relation to the fuselage, as described in FIGS. 3-6. A second set of resilient members (1140) and (1150) are positioned adjacent to the trailing edges (1112) and (1122). The second set of resilient members (1140) and (1150) are shown holding the trailing edges (1112) and (1122) in a neutral position. FIG. 12 is a top view (1200) of the vehicle with wings (1210) and (1220) in a flex forward position. As shown, the second set of resilient members (1240) and (1250) are shown extended, holding the trailing edges (1212) and (1222) in a forward position while in communication with the fuselage. In one embodiment, the second set of resilient members (1140), (1150) and (1240), (1250) are rubber bands, bungy cords, or other forms of connectors having resilient properties. FIG. 13 is a top view (1300) of the vehicle with wings (1310) and (1320) in a neutral position. As shown, a set of spring loaded detents (1340) and (1350) are shown positioned in communication with the fuselage and adjacent to the trailing edges (1312) and (1322). The set of spring loaded detents (1340) and (1350) are shown holding the trailing edges (1312) and (1322) in a neutral position. FIG. 14 is a top view (1400) of the vehicle with wings (1410) and (1420) in a flex forward position. As shown, the spring loaded detents (1440) and (1450) are detached from the fuselage. In one embodiment, the resilient member shown in FIGS. 3-6 function to hold the wings in communication with the fuselage at such time as the spring loaded detents detach from the trailing edges. In one embodiment, an alternative member may be employed to secure the trailing edge of the wings to the fuselage, and as such, the invention should not be limited to the embodiments described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

ALTERNATIVE EMBODIMENT

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. An aerial vehicle comprising:
 a fuselage having a trailing edge;
 first and second winged surfaces in communication with the fuselage, the winged surfaces each having a front edge and an oppositely disposed rear edge;
 a cuff in communication with the front edges of the winged surfaces;
 a first member in communication with each of the first and second winged surfaces, the cuff and the first member allowing regulated separation of the first and second wing surfaces at the rear edges in a first direction in a first flexed state; and
 a second member in communication with the rear edges hold the rear edges in communication with the trailing edge, the second member allowing regulated separation of the first and second wing surfaces at the front edges in a second direction, different from the first direction, in a second flexed state.

2. The vehicle of claim 1, further comprising the cuff to maintain communication with the front edge of each of the winged surfaces in the first flexed state.

3. The vehicle of claim 1, further comprising the winged surfaces to pivot about the cuff in the first flexed state.

4. The vehicle of claim 1, further comprising an airflow measurement apparatus in communication with one of the front edges.

5. The vehicle of claim 4, further comprising a memory retainer in communication with the airflow measurement apparatus, wherein the airflow measurement apparatus is configured to bend in response to application of a force, and wherein the memory retainer is configured to autonomously return the airflow measurement apparatus to a neutral configuration prior to application of the force.

6. The vehicle of claim 1, wherein the second member to maintain the rear edges in communication with the fuselage in the first flexed state.

7. The vehicle of claim 1, wherein the separation of the winged surfaces in the second flexed state is performed with respect to a pivot point at each of the trailing edges.

8. The vehicle of claim 1, further comprising the front edges to separate from the cuff in the second flexed state.

9. The vehicle of claim 1, wherein the second member is adapted to release under force.

10. An aerial vehicle comprising:
 a fuselage having a trailing edge;
 first and second winged surfaces in communication with the fuselage, the winged surfaces each having a front edge and an oppositely disposed rear edge, and wherein the winged surfaces are adjacently positioned in a neutral state and spaced apart when subject to a force;
 a cuff in communication with the front edges of the winged surfaces, wherein the cuff supports and maintains stability of the winged surfaces;
 a first member in communication with each of the first and second winged surfaces, the cuff and the first member allowing regulated separation of the first and second wing surfaces at the rear edges in a first direction in a first flexed state; and
 a set of second members in communication with the rear edges to hold the rear edges in communication with the trailing edge, the set of second members allowing regulated separation of the first and second wing surfaces at the front edges in a second direction, different from the first direction, in a second flexed state.

11. The aerial vehicle of claim 10, further comprising the first member to maintain communication across a gap formed between the winged surfaces in the first flexed state.

12. The aerial vehicle of claim 10, wherein the winged surfaces maintain communication with the fuselage in the first flexed state.

13. The aerial vehicle of claim 10, further comprising the cuff to maintain communication with the front edge of each of the winged surfaces in the first flexed state.

14. The aerial vehicle of claim 10, further comprising the winged surfaces to pivot about the cuff in the first flexed state.

15. The aerial vehicle of claim 10, further comprising the fuselage having a first servo to receive a first aperture of the first winged surface and a second servo to receive a second aperture of the second winged surface, the first and second servo oppositely disposed on the fuselage.

16. The aerial vehicle of claim 10, wherein the set of second members to maintain the rear edges in communication with the fuselage in the first flexed state.

17. The aerial vehicle of claim 10, wherein the separation of the winged surfaces in the second flexed state is performed with respect to a pivot point at each of the trailing edges.

18. The aerial vehicle of claim 10, further comprising the front edges of the winged surfaces to separate from the cuff in the second flexed state.

19. The aerial vehicle of claim 10, wherein the set of second members holds the rear edges in a backward position while in communication with the fuselage in the second flexed state.

20. The aerial vehicle of claim 10, wherein the set of second members are adapted to release under force.

21. The aerial vehicle of claim 20, wherein the set of second members are spring loaded detents.

22. The aerial vehicle of claim 10, further comprising an airflow measurement apparatus in communication with one of the front edges.

23. The aerial vehicle of claim 22, wherein the airflow measurement apparatus extends through a body of the front edge.

24. The aerial vehicle of claim 22, further comprising a memory wire housed within the airflow measurement apparatus.

25. The aerial vehicle of claim 24, further comprising wherein the airflow measurement apparatus is configured to bend in response to application of a force, and wherein the memory wire is configured to autonomously return the airflow measurement apparatus to a neutral configuration prior to application of the force.

* * * * *